UNITED STATES PATENT OFFICE.

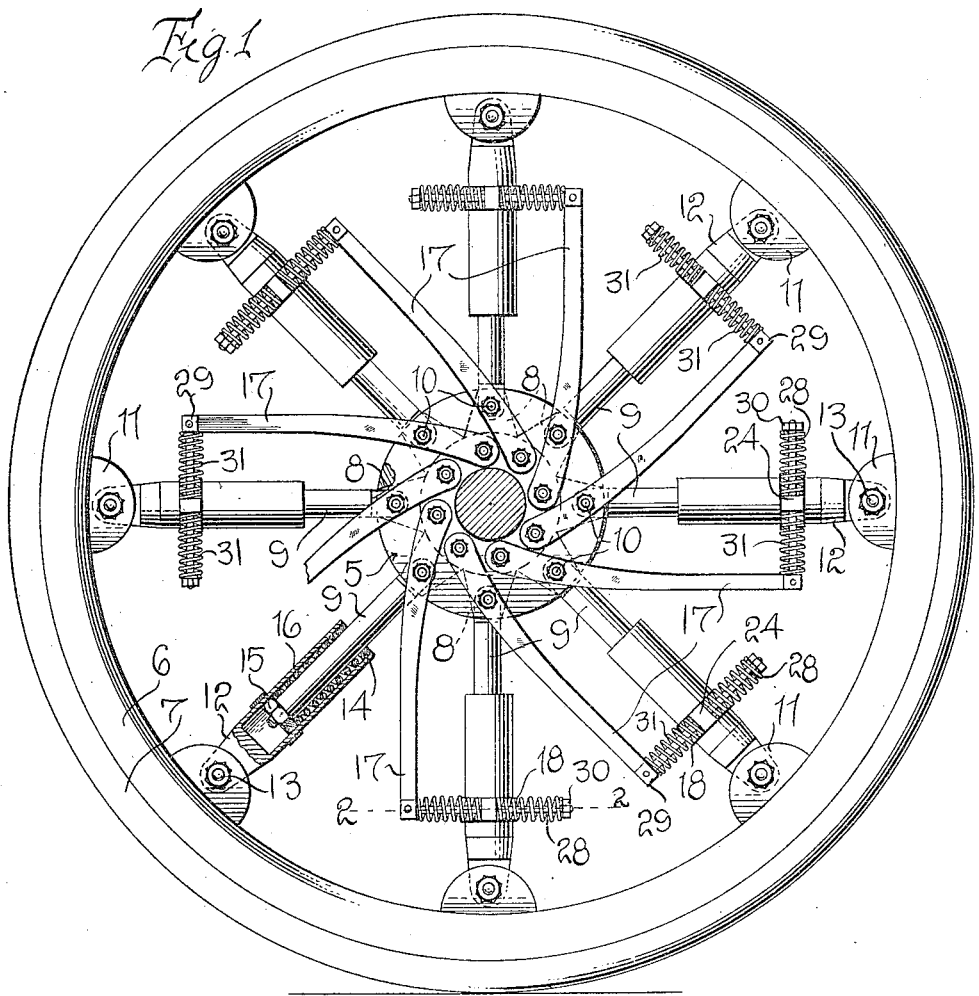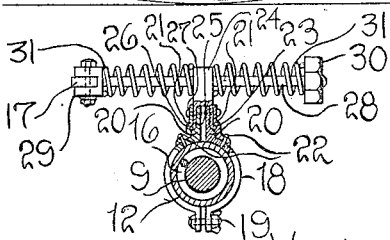

WILLIAM ROY BOWLING, OF SELDEN, KANSAS.

SPRING-WHEEL.

1,225,404. Specification of Letters Patent. Patented May 8, 1917.

Application filed December 24, 1915. Serial No. 68,585.

*To all whom it may concern:*

Be it known that I, WILLIAM ROY BOWLING, a citizen of the United States, residing at Selden, in the county of Sheridan and State of Kansas, have invented certain new and useful Improvements in Spring-Wheels, of which the following is a specification, reference being had to the accompanying drawings.

This invention relates to improvements in spring wheels and has for its primary object to provide a wheel upon which a solid tread may be employed and, at the same time, to produce a maximum resiliency in the wheel structure, whereby the same will yield to shocks or jars irrespective of the direction from which they may be applied to the rim of the wheel.

It is an additional object of the invention to provide a wheel of the above type, especially designed for use upon motor vehicles, which includes telescoping spokes extending between the hub and wheel rim and means yieldingly retarding the telescoping action of the spoke sections, and additional means connecting the outer spoke section and the wheel hub and having yielding movement relative to said spoke section to absorb vertically applied shocks and to limit rotative movement of the wheel hub with respect to the rim.

It is an additional object of the invention to provide a wheel of the above type, which is comparatively simple as well as strong and durable in its construction, and will reliably accomplish the purpose for which the same is devised.

With the above and other objects in view, my invention consists in the novel features of construction, combination, and arrangement of parts to be hereinafter more fully described, claimed and illustrated in the accompanying drawing, in which, Figure 1 is a side elevation of a wheel constructed in accordance with the preferred embodiment of the invention, one of the wheel spokes being shown in section; and Fig. 2 is an enlarged section taken on the line 2—2 of Fig. 1.

Referring in detail to the drawing, 5 designates the hub of the wheel and 6 the rim or felly thereof which may be provided with a solid rubber tire, indicated at 7. The wheel hub 5 is provided with a plurality of spaced radially disposed sockets or recesses 8 to receive the ends of the inner spoke sections 9 which are fulcrumed upon the pivot pins 10 traversing said recesses. These inner spoke sections are of solid metal construction.

To the wheel rim or felly 6, at spaced points, the inwardly projecting ears 11 are suitably secured, and to the respective ears the outer end of one of the hollow metal spoke sections 12 is pivotally connected, as at 13. The inner sections 9 of the spokes have a loose sliding engagement in the metal sleeves 14 which are threaded in the inner ends of the spoke sections 12. The outer end of each spoke section 9 is reduced and threaded to receive a nut 15, and between said nut and the sleeve 14 a coil spring 16 is arranged upon the spoke section 9. This coil spring, by its expansive action, yieldingly holds the two spoke sections against relative sliding movement which would extend the same. Radial thrusts upon the wheel rim will act to shift the outer spoke sections 12 below the wheel hub, inwardly upon the sections 9, while the sections 12 of the spokes above the head are moved outwardly on the spoke sections 9 and the spring 16 compressed. It is apparent, however, that there will also be a tendency of the wheel rim to shift circumferentially with respect to the hub, and the pressure thus applied upon said hub would result in a displacement thereof, or in the distortion of the telescoping spoke sections.

In order to overcome the difficulty above referred to, I provide a rigid arm or brace 17 associated with each of the spokes and rigidly fixed at its inner end to the wheel hub. Upon the outer tubular spoke section 12, a sectional collar is engaged, the collar sections 18 being securely clamped together at one of their ends by the bolt indicated at 19. The opposite end of each collar section is formed with the laterally extending, tapering, semicircular arm 20. 21 designates two sleeve sections which are of considerably greater diameter than the arms 20 when the latter are arranged in opposed relation, said sleeve sections being disposed in spaced parallel relation to said arms. The inner ends of these sleeve sections are riveted or otherwise securely fixed, as at 22, to the respective collar sections 18, and adjacent to its inner end each sleeve section is formed with a groove, indicated at 23. 24 designates a guide member having a tubular end portion 25 which is engaged over the arms 20 between the same and the sleeve sections 21 and, at its extremity, is formed with a bead 26 which is adapted to be engaged in the grooves 23. The collar sections 21 are also preferably connected together at their outer ends and on opposite sides by suitable clamping bolts, indicated at 27. Thus, it will be apparent that the guide 24 may rotate freely within the sleeve sections 21 and upon the arms 20. The outer end of this guide is provided with an opening through which a rod 28 is loosely disposed, said rod extending at right angles to the spoke section 12, as clearly shown in Fig. 1 of the drawing. One end of the rod is formed with a bifurcated head 29 to which the outer end of the brace bar 17 is pivotally connected. A nut 30 is threaded upon the opposite end of the rod 28. Upon said rod, between the nut 30 and the guide 24 and also between said guide and the head 29 on the opposite end of the rod, coil springs 34 are disposed to yieldingly hold the rod 28 against longitudinal shifting movement in either direction through the guide 24.

Having above described the several structural features of my invention, its operation will be readily understood. As the rod 28 may assume various angular positions owing to the rotatable mounting of the guide 24 upon the wheel spoke, it is apparent that, in the shifting movement of the wheel rim circumferentially as well as radially with respect to the hub, such movement is yieldingly cushioned by the action of the spring-separated spoke sections, supplemented by the action of the springs 31 upon the rod 28 which operate to yieldingly hold the respective spokes against a circumferential movement with respect to the rigid brace bar 17. Thus, the wheel hub is maintained in substantially constant position and prevented from shifting circumferentially upon the axle with respect to the rim of the wheel. The device will thus operate efficiently to completely absorb shocks and jars and prevent the same from being transmitted to the body of the vehicle, from whatever direction such forces may be applied to the rim of the wheel. It is manifest, of course, that the size and tension of the cushioning springs will vary in accordance with the load to be borne by the vehicle and the particular purpose for which the same is designed to be used. The invention is also susceptible of a great many other modifications in the form, proportion and arrangement of the several elements and I, therefore, reserve the privilege of adopting all such legitimate changes as may be fairly embodied within the spirit and scope of the invention as claimed.

Having thus fully described my invention, what I desire to claim and secure by Letters Patent is:—

A spring wheel including a wheel hub and rim, a series of spoke sections pivotally connected to the hub, a series of tubular spoke sections pivotally connected at their outer ends to the rim to telescopically receive the first named spoke sections, a collar secured upon each of the tubular spoke sections, a guide member rotatably mounted upon each collar and having its axis of rotation disposed at right angles to the spoke axis, a rod movable through each guide member, means yieldingly retarding the movement of said rod, and arms rigidly fixed to the wheel hub at their inner ends and pivotally connected to one end of the respective rods.

In testimony whereof I hereunto affix my signature in the presence of two witnesses.

WILLIAM ROY BOWLING.

Witnesses:
F. E. BENTON,
H. S. BEARDSLEY.

Copies of this patent may be obtained for five cents each, by addressing the "Commissioner of Patents, Washington, D. C."